(12) United States Patent
Baierl et al.

(10) Patent No.: US 11,921,713 B2
(45) Date of Patent: Mar. 5, 2024

(54) SYSTEMS AND METHODS FOR AUTOMATING MAPPING OF REPAIR PROCEDURES TO REPAIR INFORMATION

(71) Applicant: Mitchell International, Inc., San Diego, CA (US)

(72) Inventors: Scott Baierl, San Diego, CA (US); Abhijeet Gulati, San Diego, CA (US); Jerry Gastineau, San Diego, CA (US); Penny Genovese, San Diego, CA (US); Vicki Gurner, San Diego, CA (US); John Strong, San Diego, CA (US); Sarika Gupta, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 0 days.

(21) Appl. No.: 17/516,509

(22) Filed: Nov. 1, 2021

(65) Prior Publication Data

US 2022/0058190 A1    Feb. 24, 2022

Related U.S. Application Data

(62) Division of application No. 16/944,038, filed on Jul. 30, 2020, now Pat. No. 11,544,256.

(51) Int. Cl.
*G06F 16/242* (2019.01)
*G06F 16/2458* (2019.01)
*G06F 16/28* (2019.01)
*G06F 16/93* (2019.01)
*G07C 5/00* (2006.01)

(52) U.S. Cl.
CPC ........ *G06F 16/244* (2019.01); *G06F 16/2465* (2019.01); *G06F 16/284* (2019.01); *G06F 16/93* (2019.01); *G07C 5/006* (2013.01)

(58) Field of Classification Search
CPC .... G06F 16/242; G06F 16/2465; G06F 16/93; G06F 16/28; G06F 16/244; G06F 16/284; G07C 5/006
See application file for complete search history.

(56) References Cited

U.S. PATENT DOCUMENTS

| 5,432,904 A | 7/1995 | Wong |
| 5,504,674 A | 4/1996 | Chen et al. |
| 5,950,169 A | 9/1999 | Borghesi et al. |
| 6,047,858 A | 4/2000 | Romer |
| 6,107,399 A | 8/2000 | Selley et al. |
| 6,381,561 B1 | 4/2002 | Bomar, Jr. et al. |

(Continued)

*Primary Examiner* — Kuen S Lu
(74) *Attorney, Agent, or Firm* — Sheppard Mullin Richter & Hampton LLP

(57) ABSTRACT

Systems and methods are provided for automating the process of mapping repair documents, published by Original Equipment Manufacturers (OEMs), to repair information provided in a repair estimate record. A baseline set of repair estimate records specifying one or more parts of a baseline vehicle and an associated set of repair documents specifying instructions for repairing the one or more parts of the baseline vehicle may be saved using a data categorization model in a mapping dataset. The repair documents associated with baseline set of repair estimate records which have been saved in the mapping dataset may then be used to automatically determine associations between another set of repair estimate records and corresponding repair documents.

20 Claims, 6 Drawing Sheets

(56) References Cited

U.S. PATENT DOCUMENTS

| | | |
|---|---|---|
| 6,470,303 B2 | 10/2002 | Kidd et al. |
| 6,885,981 B2 | 4/2005 | Bomar, Jr. et al. |
| 7,197,444 B2 | 3/2007 | Bomar, Jr. et al. |
| 7,359,821 B1 | 4/2008 | Smith et al. |
| 7,502,772 B2 | 3/2009 | Kidd et al. |
| 7,698,086 B2 | 4/2010 | Kidd et al. |
| 7,716,002 B1 | 5/2010 | Smith |
| 7,974,808 B2 | 7/2011 | Smith |
| 8,019,629 B1 | 9/2011 | Medina, III et al. |
| 8,095,391 B2 | 1/2012 | Obora et al. |
| 8,160,904 B1 | 4/2012 | Smith |
| 8,239,220 B2 | 8/2012 | Kidd et al. |
| 8,260,639 B1 | 9/2012 | Medina, III et al. |
| 8,612,170 B2 | 12/2013 | Smith et al. |
| 8,712,806 B1 | 4/2014 | Medina, III et al. |
| 9,218,626 B1 | 12/2015 | Haller, Jr. et al. |
| 9,228,834 B2 | 1/2016 | Kidd et al. |
| 9,500,545 B2 | 11/2016 | Smith et al. |
| 9,721,400 B1 | 8/2017 | Oakes, III et al. |
| 9,846,093 B2 | 12/2017 | Smith et al. |
| 10,319,035 B2 | 6/2019 | Nelson et al. |
| 10,339,728 B1 | 7/2019 | Oakes, III et al. |
| 10,360,601 B1 * | 7/2019 | Adegan ............ G06Q 30/0283 |
| 10,410,439 B1 | 10/2019 | Gingrich et al. |
| 10,510,142 B1 | 12/2019 | Dohner et al. |
| 10,922,726 B1 | 2/2021 | Nelson et al. |
| 10,949,814 B1 | 3/2021 | Nelson et al. |
| 11,242,051 B1 * | 2/2022 | Konrardy .......... G08G 1/096791 |
| 2005/0267774 A1 | 12/2005 | Merritt et al. |
| 2006/0064393 A1 * | 3/2006 | Orr ..................... G06Q 10/10 <br> 705/400 |
| 2008/0281658 A1 * | 11/2008 | Siessman ............ G06Q 30/0283 <br> 705/400 |
| 2013/0297353 A1 * | 11/2013 | Strange ............... G06V 30/412 <br> 705/4 |
| 2014/0122130 A1 | 5/2014 | Kelly et al. |
| 2014/0279169 A1 | 9/2014 | Leos |
| 2015/0213556 A1 | 7/2015 | Haller, Jr. et al. |
| 2016/0178465 A1 | 6/2016 | Smith et al. |
| 2017/0262815 A1 * | 9/2017 | Shipman .......... G06Q 10/0875 |
| 2018/0121888 A1 | 5/2018 | O'Reilly |
| 2018/0300576 A1 | 10/2018 | Dalyac et al. |
| 2021/0295441 A1 * | 9/2021 | Mullen .................. G08G 1/04 |

* cited by examiner

SYSTEMS AND METHODS FOR AUTOMATING MAPPING OF REPAIR PROCEDURES TO REPAIR INFORMATION

RELATED APPLICATIONS

This application is a divisional of U.S. patent application Ser. No. 16/944,038, filed on Jul. 30, 2020, issued as U.S. Pat. No. 11,544,256, the contents of which are incorporated herein by reference in its entirety.

The present application is also related to U.S. patent application Ser. No. 17/516,501, filed Nov. 1, 2021, which is also a divisional of U.S. patent application Ser. No. 16/944,038, filed on Jul. 30, 2020, issued as U.S. Pat. No. 11,544,256.

TECHNICAL FIELD

The present disclosure is generally related to systems and methods for automating the mapping of repair procedures to repair information, and more particularly, some embodiments relate to a systems and methods for implementing the same.

SUMMARY

In accordance with one or more embodiments, various features and functionality can be provided for automating the mapping of repair procedures to repair information.

In some embodiments, a method may receive a baseline set of repair estimate records and an associated set of repair documents. For example, the baseline set of repair estimate records may be received from a data repository.

In some embodiments, each baseline repair estimate record may specify one or more parts of a baseline vehicle and may be associated with a repair document. In some embodiments, each repair document may specify instructions for repairing one or more parts of the baseline vehicle.

In some embodiments, vehicle information may be extracted from the baseline set of repair estimate records and the set of repair documents. For example, the vehicle information may include a year, a make, a model, and an engine of the baseline vehicle.

In some embodiments, the extracted vehicle information and the associated repair documents may be saved using a data categorization model in a mapping dataset.

In some embodiments, the method may receive another set of repair estimate records. For example, each repair estimate record may specify one or more parts associated with another vehicle.

In some embodiments, each repair document associated with the one or more parts specified by the baseline set of repair estimate records may include a general title and a sub-title. Similarly, each repair document associated with the one or more parts specified by the another set of repair estimate records may include a general title and a sub-title.

In some embodiments, the method may determine a corresponding repair document for each part associated with another vehicle. For example, the method may determine the corresponding repair document by identifying relevant repair documents associated with the one or more parts specified by the baseline set of repair estimate records by comparing the general title and the sub-title of each repair document associated with the one or more parts specified by the baseline set of repair estimate records to each repair document associated with the one or more parts specified by another set of repair estimate records.

In some embodiments, the method may store these determinations as associations between the one or more parts of another vehicle and the corresponding repair document. For example, the associations may be stored as association records in the data repository.

In some embodiments, the method may determine validity of the association record by confirming that the determined repair document corresponds to the one or more parts of another vehicle. In some embodiments, when the association record is determined to be invalid, the method may remove the association record from the data repository.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION

Figure 1:
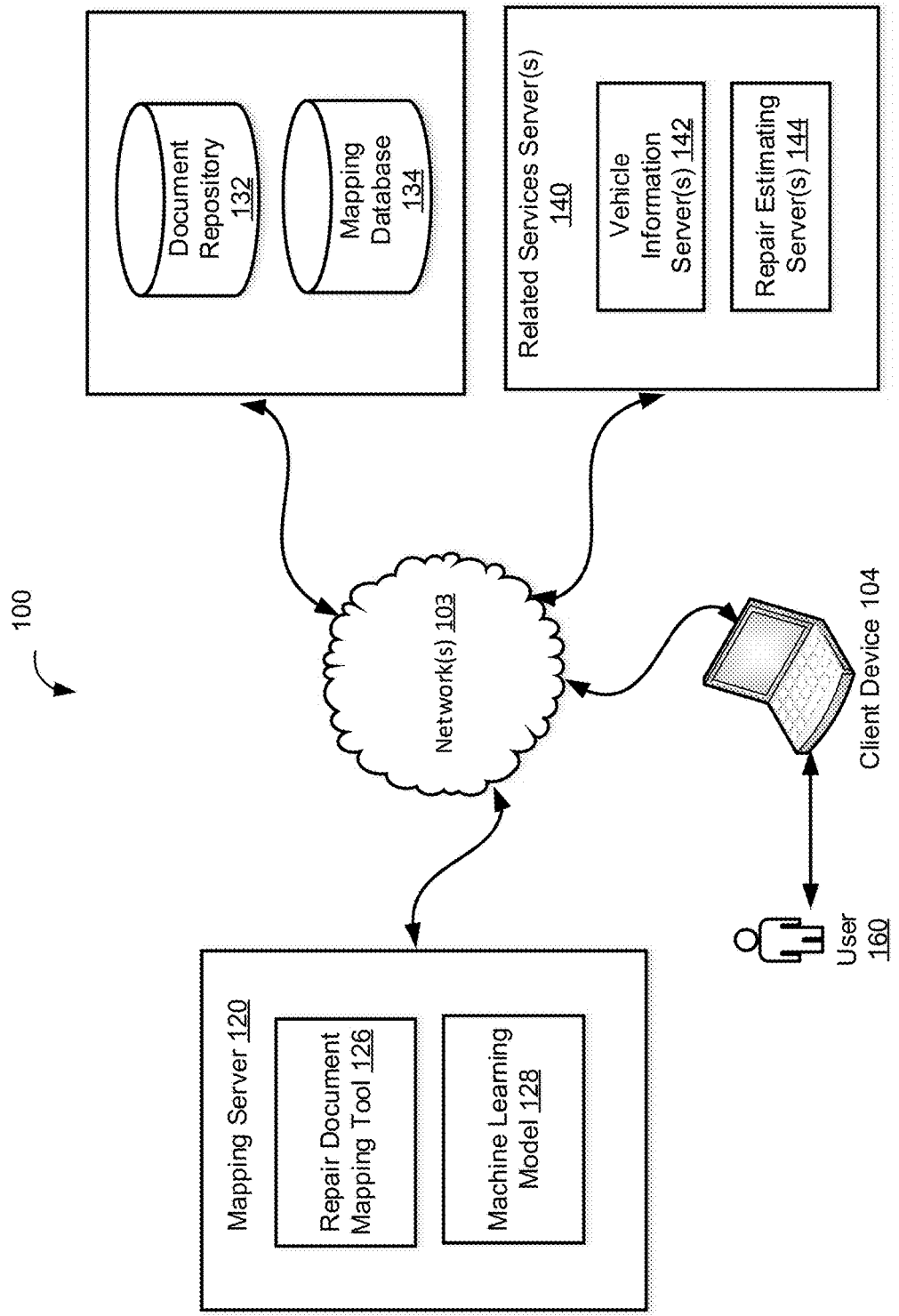
FIG. 1 illustrates an example automated repair information mapping system, according to an implementation of the disclosure.

Described herein are systems and methods for automating the process of associating repair documents published by Original Equipment Manufacturers (OEMs) with repair information. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

OEMs generate repair manuals which include technical information used to service and maintain a vehicle (e.g., repair instructions, diagnostic information, diagramed repair and replacement procedures, electrical diagrams and training information) specific to Body Type, Year, Make, Model, Submodel, Engine, Transmission and Drive. In some embodiments the OEM repair manuals may be specific to Year, Make, Model and Engine (YMME). In addition to providing detailed repair instructions that ensure accurate and compliant vehicle repair, these OEM repair documents often call for specific parts or tools by using an OEM part number, simplifying the ordering process. For example, during a repair of a left front fender in a GM vehicle, the repair technician may be referencing a particular set of documents for that specific vehicle.

Individual OEMs publish repair manuals in a variety of formats, each manual for specific to Body Type, Year, Make, Model, Submodel, Engine, Transmission and Drive and/or YMME comprising thousands of individual repair documents. However, most OEMs generally utilize some type of data standardization and naming convention protocols across all its manufactured vehicles. For example, repair documents published by a particular OEM may include identifying data, e.g., document title, resulting in similarly named documents for a particular part. While the contents of the documents may vary based on Body Type, Year, Make, Model, Submodel, Engine, Transmission and Drive and/or YMME, the type(s) of repair documents may be the same. It is understood that when Body Type, Year, Make, Model, Submodel, Engine, Transmission and Drive and/or YMME may be used interchangeably within the scope of the present disclosure.

Undoubtedly, referencing OEM repair documents during the repair process (i.e., collision repair or mechanical repair) ensures the highest level of quality and safety. Yet, identifying which particular OEM document should be used for a specific vehicle, part, and/or labor operation, for example as identified in a collision repair estimate/mechanical repair estimate or repair order line item entry, has been a challenge. Especially, when taking into consideration the considerable time and skill required to locate each particular repair document. Because of the sheer volume of repair procedure documents, greatly varying in format even across the same OEM, a conventional document-to-vehicle association process cannot be performed without manual human input. For example, a user with specific knowledge of vehicles and vehicle repair processes is required to review individual OEM repair documents and determine which repair document is associated with particular repair information (e.g., a vehicle, part, and/or a labor operation). Such manually determined associations may be stored in a database and utilized during various aspects of the repair cycle, by using a computerized system. However, manual association or mapping of individual repair documents to specific vehicle parts or labor operations process requires constant updating and review, as new repair documents for new vehicles are published by OEMs. Moreover, because the current process relies heavily on human input, it is inefficient and subject to potential errors.

Embodiments of the disclosed technology provide a tool for automating the mapping of repair documents from a variety of OEMs to specific repair information. The tool utilizes existing associations determined manually to identify common elements across repair documents, regardless of the OEM or being specific to YMME. Upon analyzing existing associations, the tool generates associations for new, previously unmapped repair documents. For example, the tool may map repair documents for a GM Chevrolet Impala based on current associations for a GM Chevy Cruze. The tool may also provide mechanisms to review the association results, which can then be accepted or rejected based on a particular protocol or threshold. For example, the tool may programmatically map other vehicle information by using associations between part(s) and and/or repair operation(s) and particular repair document(s) for other vehicles stored in a relational database (e.g., in a mapping database). In some embodiments, machine learning models may be employed to determine associations between repair documents and repair information, as described in detail below.

This automatic repair document-to-vehicle association process provides several advantages. First, automating the association process greatly reduces manual human effort required in a conventional repair document-to-vehicle mapping process, as alluded to above. Reduction in human effort in turn reduces cost and increases delivery of information. Second, the automation of the repair document-to-vehicle association process allows standardization of common repair procedure documents across vehicles in a collision repair estimate. For example, "Front Bumper Lower Fascia Replacement" repair procedures will always be associated with the "Front Bumper" Labor Note for the "FRT FRAME ASSEMBLY" part. Finally, automation of the repair document-to-vehicle mapping allows for more timely delivery of accurate repair procedures to the market. As soon as the repair procedures are created and available from the OEM, they can be mapped utilizing the mapping process disclosed herein, and delivered to the market shortly thereafter.

System

FIG. 1 illustrates an automated repair document-to-vehicle association system 100 according to some embodiments of the disclosed technology. In some embodiments, system 100 may include a mapping server 120, a document repository 132 configured to store repair documents and other related information, a mapping database 134 configured to store associations between repair documents and repair information, as described above, a one or more related services server(s) 140 (e.g., vehicle information server(s) 142, repair estimate server(s) 144, and other such similar servers), a network 103, and a client computing device 104. A user 160 may be associated with client computing device 104 as described in detail below. Additionally, system 100 may include other network devices such as one or more routers and/or switches.

In some embodiments, client computing device 104 may include a variety of electronic computing devices, for example, a smartphone, a tablet, a laptop, a display, a mobile phone, a computer wearable device, such as smart glasses, or any other head mounted display device, or a combination of any two or more of these data processing devices, and/or other devices.

Mapping Server

In some embodiments, mapping server 120 may include a processor, a memory, and network communication capabilities. In some embodiments, mapping server 120 may be a hardware server. In some implementations, mapping server 120 may be provided in a virtualized environment, e.g., mapping server 120 may be a virtual machine that is executed on a hardware server that may include one or more other virtual machines. Additionally, in one or more embodiments of this technology, virtual machine(s) running on mapping server 120 may be managed or supervised by a hypervisor. Mapping server 120 may be communicatively coupled to network 103.

In some embodiments, the memory of mapping server 120 may store application(s) that can include executable instructions that, when executed by mapping server 120, cause mapping server 120 to perform actions or other operations as described and illustrated below with reference to FIGS. 2-5. For example, mapping server 120 may include repair document mapping tool 126. In some embodiments, repair document mapping tool 126, which may be implemented as one or more software packages executing on one or more mapping server 120 computers. For example, a client application implemented on one or more client computing device 104 as client mapping tool application. In some embodiments, repair document mapping tool 126 may be a server application, a server module of a client-server application, or a distributed application. In some embodiments, repair document mapping tool 126 may be implemented using a combination of hardware and software. The application(s) can be implemented as modules, engines, or components of other application(s). Further, the application(s) can be implemented as operating system extensions, module, plugins, or the like.

Even further, the application(s) may be operative locally on the device or in a cloud-based computing environment. The application(s) can be executed within or as virtual machine(s) or virtual server(s) that may be managed in a cloud-based computing environment. Also, the application(s), and even the repair management computing device itself, may be located in virtual server(s) running in a cloud-based computing environment rather than being tied to one or more specific physical network computing devices. Also, the application(s) may be running in one or more virtual machines (VMs) executing on the repair management computing device.

In some embodiments, document repository 132 may include one or more databases, which may store repair documents, e.g., published by OEM or Aftermarket (AM), vehicle information, collision repair estimate information, data regarding parts, part costs, labor, labor costs, and the like. The repair procedure data may include wiring diagrams, standard repair times, etc.

In some embodiments, document repository 132 may include a plurality of databases configured to store content data associated with repair documents and procedures (e.g., textual information, images, videos, and/or animations, including 3D animations, as well as repair procedures workflow information). Repair documents may include information demonstrating how to perform repairs of various parts for a variety of different types and models of vehicles. Additionally, document repository 132 may include sensor calibration documentation data, and other similar information.

In some embodiments, mapping database 134 may include one or more database, which may store association data related to manually completed mapping, automatically completed mapping, data related to incomplete or in progress mapping, and the like. In some embodiments, system 100 may employ one or more machine learning models 128, which may execute on mapping server 120.

In some embodiments, mapping server 120 may transmit and receive information to and from client computing device 104, one or more vehicle information servers 142, one or more repair estimate servers 144, one or more related services servers 140, and/or other servers via network 103. For example, a communication interface of the mapping server 120 may be configured to operatively couple and communicate between document repository 132, mapping database 134, client computing device 104, vehicle related services servers 140, including information server 142, repair estimate server 144, which are all coupled together by the communication network(s) 103.

In some embodiments, repair document mapping tool 126 may access document repository 132 and mapping databases 134 over a network 130 such as the Internet, via direct links, and the like.

In some embodiments, mapping server 120 may be a standalone device or integrated with one or more other devices or apparatuses, such as one or more of the storage devices, for example. For example, mapping server 120 may include or be hosted by one of the storage devices, and other arrangements are also possible.

Related Services Server

In some embodiments, related services server 140 may include vehicle information server 142 configured to store and/or manage vehicle information associated with a damaged vehicle. For example, vehicle information may include vehicle identification information, such as vehicle identification number (VIN), make, model, and optional modifications (e.g., sub-model and trim level), date and place of manufacture, and similar information related to a damaged vehicle. Additionally, related services server 140 may include repair estimate server 144 configured to store, manage, and process information related to completed estimates, estimates in process, configured to store data related to collision repair estimate data maintained by the collision repair entity or the automotive. In some embodiments, repair estimate server 144 may be configured to communicate with third-party services (e.g., automotive insurance carriers, and part providers) to request and receive data regarding parts, part costs, labor, labor costs, and such similar data related to a particular repair event.

In some embodiments, each of related services server 140, vehicle information server 142, and repair estimate server 144 may include any type of computing device that can be used to interface with mapping server 120 and/or repair document mapping tool 126, document repository 132, mapping databases 134, other related services servers 140, and client computing device tool 104. For example, each of related services server 140, vehicle information server 142, and repair estimate server 144 may include a processor, a memory, and a communication interface, which are coupled together by a bus or other communication link, although other numbers and/or types of network devices could be used. In some embodiments, each of related services server 140, vehicle information server 142, and repair estimate server 144 may also include a database.

System Architecture

In some embodiments, mapping server 120, related services server 140, vehicle information server 142, and repair estimate server 144, and or other components may be a single device. Alternatively, a plurality of devices may be used. For example, the plurality of devices associated with related services server 140, vehicle information server 142, and repair estimate server 144 may be distributed across one or more distinct network computing devices that together comprise one or more related services server 140, vehicle information server 142, and repair estimate server 144.

In some embodiments, mapping server 120, related services server 140, vehicle information server 142, and repair estimate server 144 may not be limited to a particular configuration. Thus, in some embodiments, mapping server 120, related services server 140, vehicle information server 142, and repair estimate server 144 may contain a plurality of network devices that operate using a master/slave approach, whereby one of the network devices operate to manage and/or otherwise coordinate operations of the other network devices. Additionally, in some embodiments, mapping server 120, related services server 140, vehicle information server 142, and repair estimate server 144 may comprise different types of data at different locations.

In some embodiments, mapping server 120, related services server 140, vehicle information server 142, and repair estimate server 144 may operate as a plurality of network devices within a cluster architecture, a peer-to-peer architecture, virtual machines, or within a cloud architecture, for example. Thus, the technology disclosed herein is not to be construed as being limited to a single environment and other configurations and architectures are also envisaged.

Although the exemplary network environment 100 with client computing device 104, mapping server 120, related services server 140, vehicle information server 142 and repair estimate server 144, and network(s) 103 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as client computing device 104, mapping server 120, related services server 140, vehicle information server 142 and repair estimate server 144 may be configured to operate as virtual instances on the same physical machine. In other words, one or more of client computing device 104, mapping server 120, related services server 140, vehicle information server 142, and/or repair estimate server 144 may operate on the same physical device rather than as separate devices communicating through communication network(s). Additionally, there may be more or fewer devices than client computing device 104, mapping server 120, related services server 140, vehicle information server 142 and repair estimate server 144.

In addition, two or more computing systems or devices can be substituted for any one of the systems or devices, in any example set forth herein. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including, by way of example, wireless networks, cellular networks, PDNs, the Internet, intranets, and combinations thereof.

Manual Process

Figure 2:
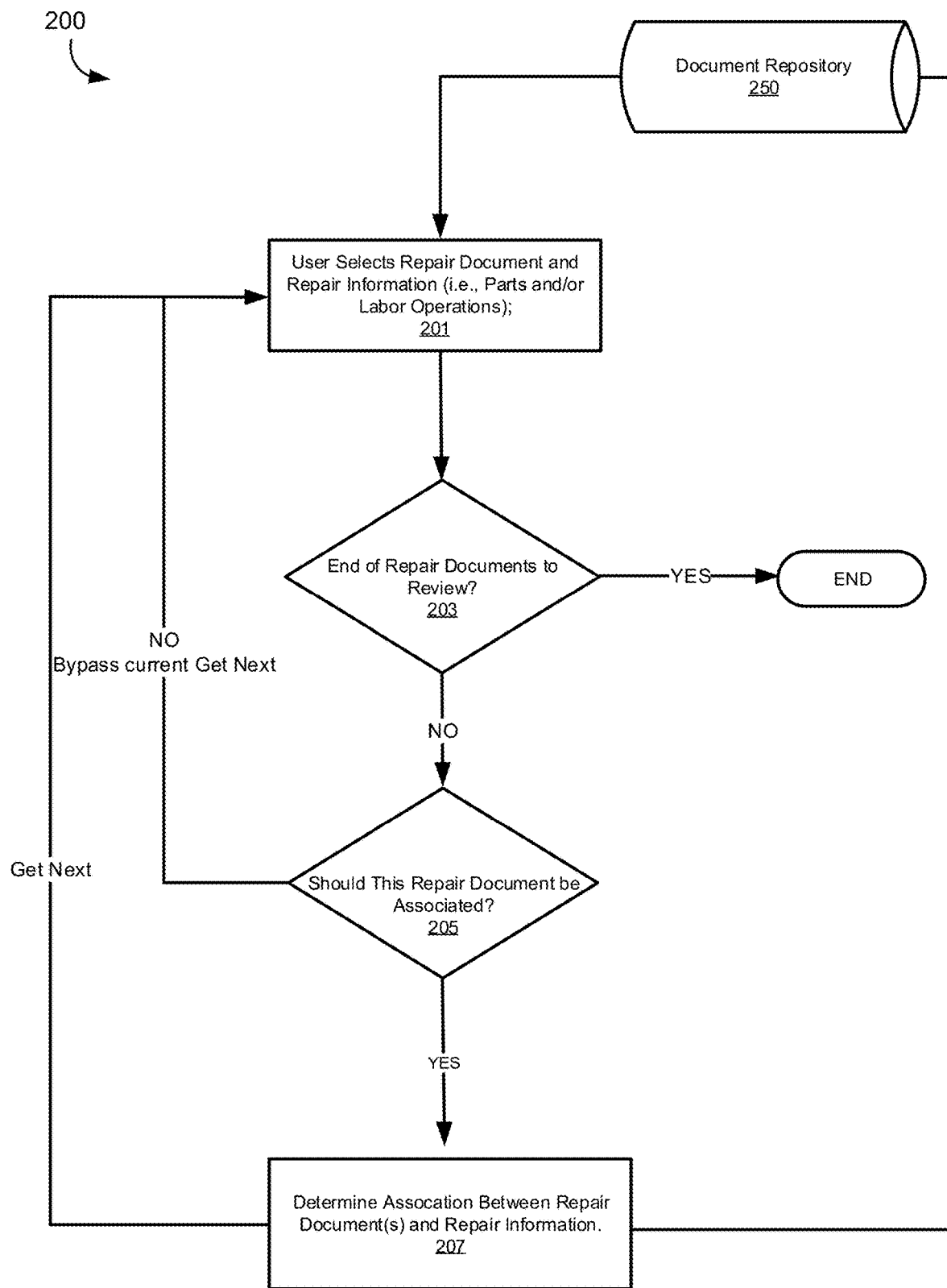
FIG. 2 illustrates an example process for manually associating repair procedures to repair information, according to an implementation of the disclosure.

FIG. 2 illustrates a process 200 for manually associating repair documents with repair information according to some embodiments of the disclosed technology. The process 200 may begin with a user (e.g., a designated content editor) selecting a repair procedure document from a content database 250 (e.g., a document repository and database) at 201. The selected repair document may include an OEM generated procedure for repairing a particular vehicle part (e.g., a front left fender) of a specific YMME vehicle. Next, the user reviews the selected repair document, including the document's title and actual contents of the document. Upon reviewing the selected repair document the user may determine that this particular document should not be associated (e.g., because it has already been associated previously or it involves a non-collision related procedure).

Accordingly, at 203, the user determines whether the manual mapping process is complete and there are no more repair documents to review. If so, the user concludes the manual association process 200. Conversely, if manual association process 200 has not been completed for the selected repair document, at 205, the user determines whether the document should be associated with a particular vehicle part and/or labor operation, and if so, makes the association determination and records it at 207. The information related to a particular vehicle part and/or labor operation may be obtained from an itemized repair estimate database providing information related to parts and/or labor operations required to repair collision damage. The user utilizes their knowledge of vehicles, repair process, and other skills when making this determination. For example, the OEM repair procedure for a front left fender of a specific YMME vehicle may be associated with the line item for repairing the front left fender in the same YMME vehicle of a repair estimate.

In some embodiments, the user may record the association between the repair document and the specific part(s) and/or labor operation(s) determined at 207 using a software application (e.g., Mitchell Authoring program). For example, associations between vehicle part(s) and/or repair operation(s) and particular repair document(s) may be stored in a relational database (e.g., in a mapping table). In some embodiments, associations between repair documents and repair estimate line items may be stored in accordance with one or more data rules and in individual tables within repair document repository.

Alternatively, upon determining that the document should not be associated with a particular vehicle, part and/or labor operation, the user returns to operation 201 and selects the next repair procedure document and performs the above steps.

Automated Mapping

Figure 3:
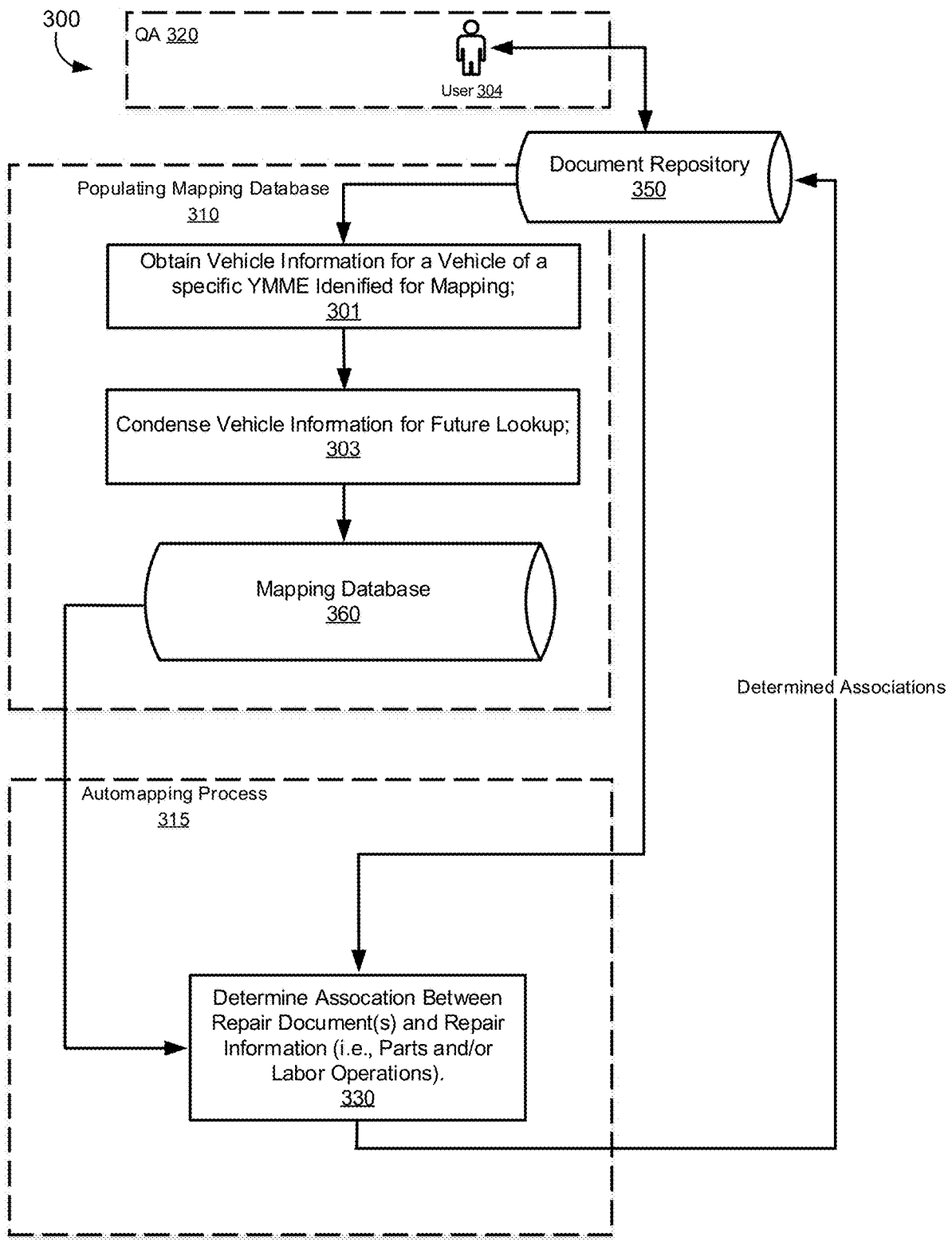
FIG. 3 illustrates an example process for automating the mapping of repair procedures to repair information.

As alluded to earlier, the manual mapping process illustrated in FIG. 2 is labor intensive and costly, as it may take a skilled user four or more hours to perform the mapping between all repair documents for a particular vehicle. By virtue of automating the mapping process, results in significant cost savings and improves data reliability and accuracy. For example, FIG. 3 illustrates a process 300 for automatically associating repair documents with repair information according to some embodiments of the disclosed technology.

The process 300 may include multiple phases. For example a first phase comprising populating a mapping database process 310, a second phase comprising an automapping process 315, and a third phase comprising a quality assurance process 320.

The populating of mapping database process 310 may begin with populating the mapping database 360 with previously associated repair documents (e.g., during a manual process as illustrated in FIG. 2). In particular, at 301, process 310 receives repair documents that have been associated with vehicle parts and/or labor operations for a particular vehicle. Next, process 310 extracts vehicle information associated with received repair documents. For example, vehicle information may include vehicle identification information such as vehicle identification number (VIN), make, model, and optional modifications (e.g., sub-model and trim level), date and place of manufacture, and other such similar information related to a damaged vehicle. In some embodiments, at 301, process 310 received repair documents for a particular YMME vehicle, which may be designated by a user.

Next, at 303, the vehicle information is aggregated and/or condensed into a distinct data set utilizing a particular data structure. For example, repair document information and vehicle information may be condensed based category, component type, damage location, labor operation, vehicle type, document title(s), and/or other information when locating related repair documents. By virtue of condensing the vehicle information this way, it may be optimized for future lookup (e.g., during the automapping process 315).

In some embodiments, the information may be condensed based on document title(s) of associated repair documents. For example, most OEMs use standard document naming conventions across multiple YMME vehicles for common and/or generic repair documents. For example, General Motors (GM) may use a generic title (i.e., "Cell Title") based on "Service Information Part Name" to title a common repair document. Further, GM may utilize the Cell Title when creating the title for a repair document specific to a YMME vehicle and by identifying the repair document with a "Service Manual Procedure Title" title. By utilizing this relationship between Cell Title and Service Manual Procedure Title, a mapping database 360 (i.e., a "base" mapping database) may be generated and populated with previously associated repair documents. In some embodiments, the condensed vehicle and document information is then stored in a mapping database 360. That is, mapping database 360 receives data related to associations between vehicle part(s) and/or repair operation(s) and particular repair document(s) for a vehicle indicated by the vehicle information received at 301.

As will be described in detail below, process 300 will utilize the data stored in mapping database 360 during the automated mapping of previously unmapped or new repair documents. For example, the relationships between the repair documents (i.e., document titles), vehicle parts, and/or other vehicle information stored in the base database may be analyzed and used to map previously unassociated repair documents, as described below with reference to the automapping process 315.

The second phase of process 300, i.e., the automapping process 315, may begin by receiving a previously unmapped repair document and vehicle information for a vehicle of a specific YMME, including individual vehicle part(s) and/or labor operation information (e.g., as provided by collision repair information) from a document repository 350. Next, at 330, association between received repair document and collision repair information may be determined. First, process 315 may identify vehicle part(s) and/or labor operation information provided in the associated collision repair information. Second, process 315 may determine whether mapping database 360 includes any related repair documents, i.e., repair documents describing similar parts or operations for other vehicles to the ones identified in the vehicle information. For example, process 315 may utilize information category, component type, damage location, labor operation, vehicle type, document title(s), and/or other information when locating related repair documents.

Upon determining that related document(s) exist, process 315 determines whether actual repair document(s) for the vehicle identified by the vehicle information exist. In some embodiments, particular vehicle information, e.g., YMME may be used to further narrow and/or qualify the determination process. In particular, further qualification checks on information such as vehicle base model, engine and/or part manufacturing dates may be used to determine associations between repair documents and vehicles, vehicle parts, and/or labor operations. These associations identified by process 315 may be then stored in the document repository 350.

Next, the repair documents identified during the automapping process 315 may be validated. Because new repair documents are regularly provided by the OEM, a vehicle that has already been mapped (i.e., associations between repair documents and vehicles, vehicle parts, and/or labor operations have been made) may be subsequently re-analyzed by process 315, as described above. For example, during this repeated analysis, process 315 may identify existing repair documents and bypass associations between those existing repair documents and vehicles, vehicle parts, and/or labor operations. Conversely, process 315 may identify and associate new repair documents. The validated associations determined at 330 may be stored in the document repository 350.

The third phase of process 300, i.e., a quality assurance process 320, may begin by user 304 selecting associations between repair documents and repair information (e.g., vehicle parts and/or labor operations) as determined by automapping process 315. The associations may be selected from document repository 350. Next, user 304 may manually verify the accuracy of the associations, for example by utilizing the manual mapping steps provided by process 200 illustrated in FIG. 2. The associations determined by user 304 as inaccurate may be removed or otherwise flagged within document repository 350. In some embodiments, user 304 may review the associations determined during the automapping process 315 using a software application (e.g., Mitchell Authoring program). For example, user 304 may utilize the same qualifying items used by process 315. Alternatively, process 315 may review the content of repair documents to confirm that the association performed by process 315 was accurate. Upon determining that process 315 accurately determined the association, user 304 may provide a confirmation, which may be stored in document repository 350. By contrast, upon determining that process 315 did not accurately determine the association, user 304 may reject and/or remove the association. The software application may allow user 304 to view and select associated repair documents, as well as view how the association was made (e.g., manually or by automapping process) and which associations have been reviewed, approved, and/or rejected.

Machine Learning

As mentioned above, in some embodiments, some or all associations between repair documents and repair information (e.g., vehicle repair part(s) and/or labor operation information) may be determined using a machine learning model 128, illustrated in FIG. 1. Other artificial intelligence techniques may be used instead of, or in addition to, using a machine learning model. By virtue of utilizing a machine learning approach enhances the automated mapping process described herein. In particular, by using machine learning model 128, allows the repair document mapping tool (e.g., mapping tool 126 illustrated in FIG. 1) to not only map new repair documents to vehicle information but associate repair documents with specific collision estimate records (i.e., parts and/or labor operations identified in the repair estimate report).

Figure 4A:
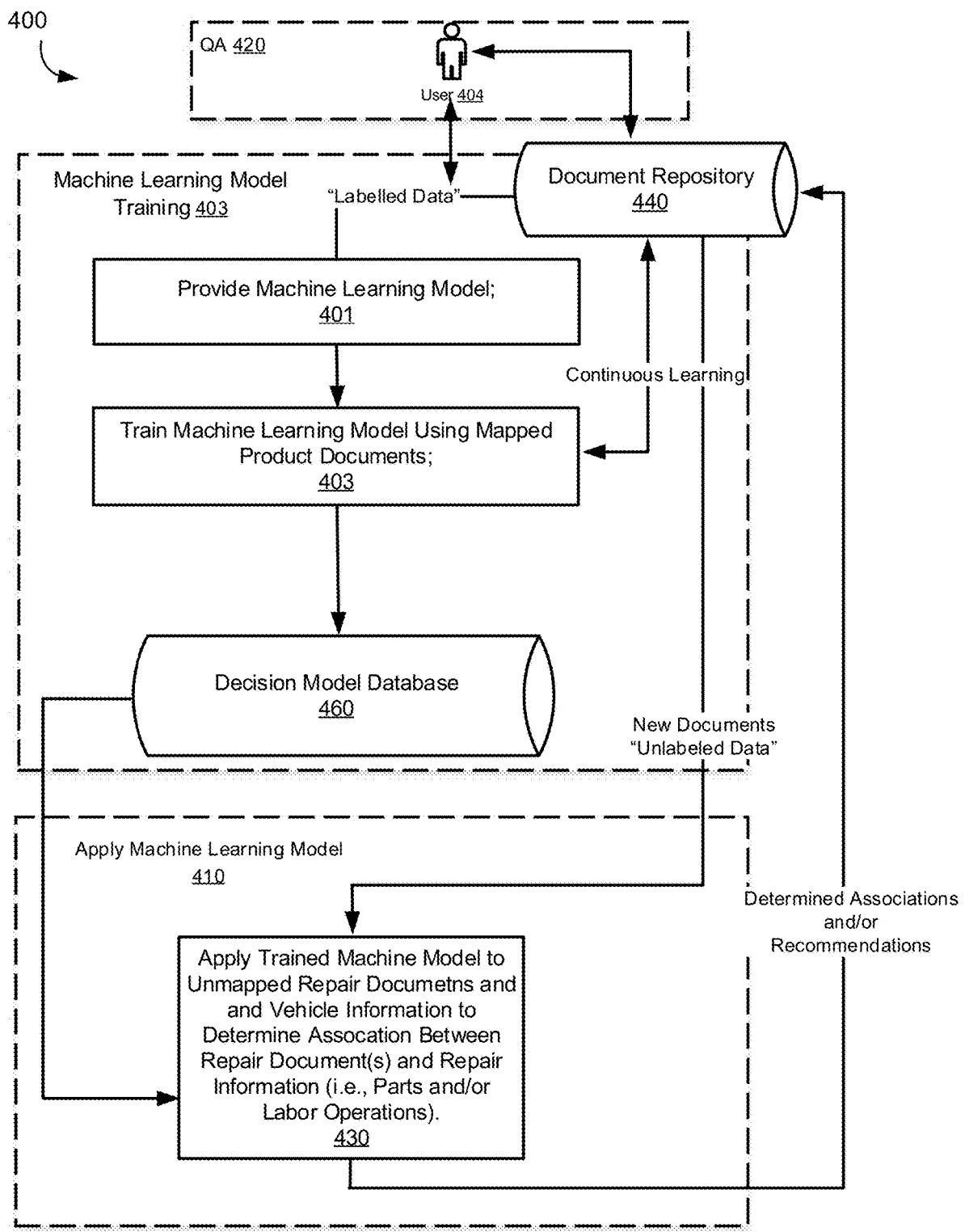
FIGS. 4A-4B illustrate an example process for using a machine learning module to map repair procedures to repair information, according to an implementation of the disclosure.

FIG. 4A illustrates a process 400 for using a machine learning model to determine associations between repair documents and repair information included in a repair estimate report for a particular vehicle of a specific YMME according to some embodiments of the disclosed technology. The process 400 may include providing a machine learning model, at 401. The machine learning model may be any machine learning mode, algorithm, or an Artificial Intelligence (AI) technique, capable of the functions described herein.

Figure 4B:
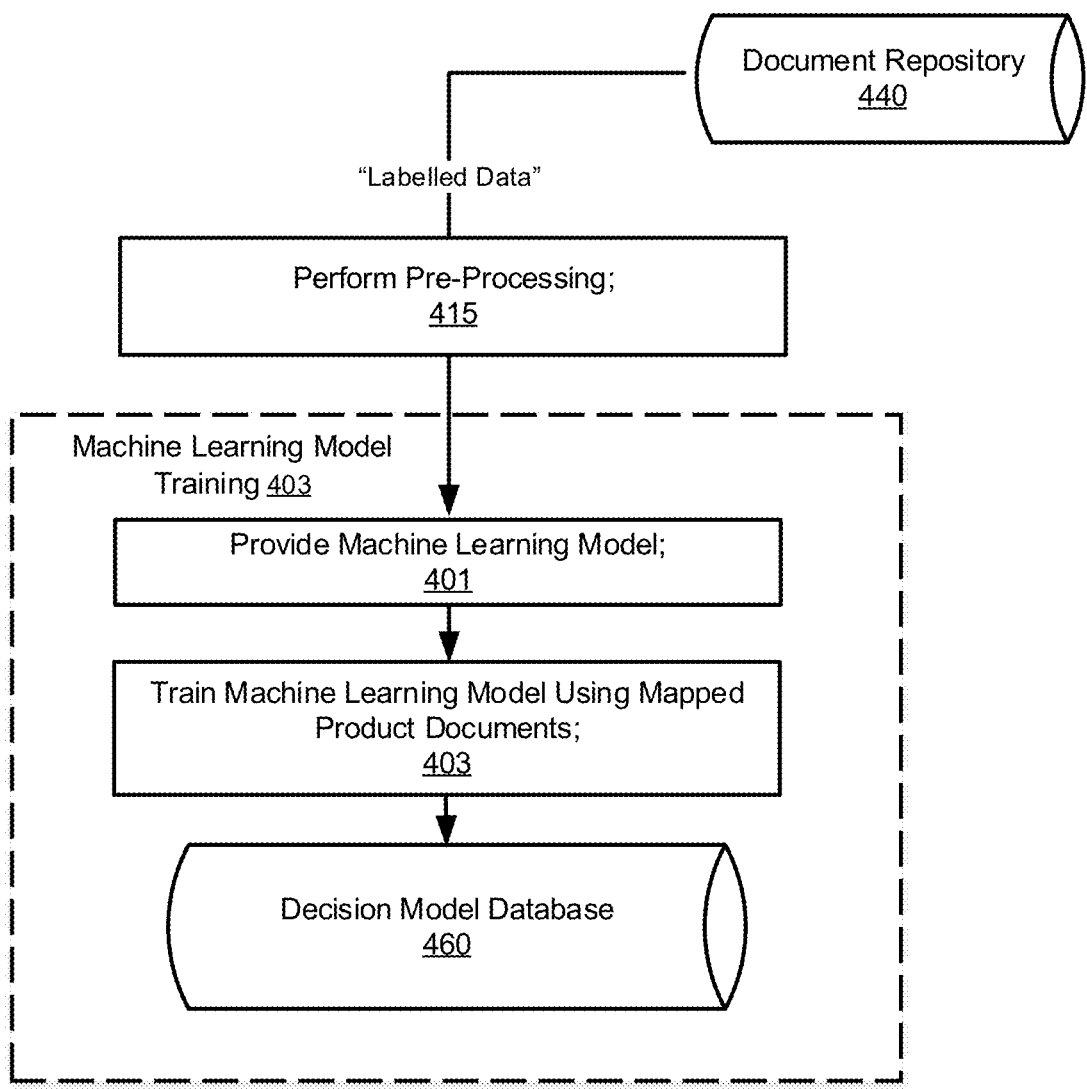

In some embodiments, as illustrated in FIG. 4B, process 400 may include a pre-processing step 415. The pre-processing step 415 may include data preparation and/or data relevancy analysis. For example, pre-processing step 415 may include curating of a corpus (e.g., a collection of repair documents) using standard natural language algorithmic techniques such as stemming/lemmatization/stop words/ HTML Tags removal/common words and can be achieved using a myriad of Natural Language Processing (NLP) tools (e.g., Beautiful Soup, NLTK, GENSIM, etc.).

Referring back to FIG. 4A, process 400 may include training the machine learning model, at 403. For example, specific keywords, phrases, images, repair document title, and/or other data elements, for the previously associated repair documents may be applied as inputs to the machine learning model. Training the machine learning model may include supervised learning, unsupervised learning, or combinations thereof. During the training stage, process 400 may include the machine learning model storing the values related to the decisions made during the training stage in a decision model database 460.

In some embodiments, training the machine learning model 403 may be trained on a document corpus (dataset) provided by document repository 440. For example, the dataset may include a large corpus of HTML based repair documents as a raw dataset. Some of the repair documents may include documents that have been "Labelled" (i.e., documents including document title, category and sub-category).

In some embodiments, training 403 may include using a two-model approach. By virtue of using the two-model approach, results in increased accuracy of process 400. The first model may be used for categorization and data relevancy by using machine learning techniques to first classify data between collision and non-collision repair document procedures. For example, the first model may be performed using feature engineering along with various standard algorithmic ways including, for example, random forest and DNN, based on document titles. By performing the first model step, results in a categorical corpus of labelled as well as unlabeled repair documents that are specifically related to collision (i.e., of being of collision category).

Next, the second model may be applied to the collision-specific corpus of labelled and unlabeled repair documents. For example, the second model may include repair classification model. Specifically, a learned combination of category/sub-category, along with frequency distribution of repair documents, may be obtained from the corpus of labelled document dataset using one or more machine learning algorithms. Here, the category/sub-category may include features related to repair information (e.g., vehicle parts and/or labor operations).

In some embodiments, a threshold may be applied to low frequency combinations resulting in a subset of relevant labelled documents. The subset of relevant labeled documents may be further mapped to the subset of labelled collection of repair documents. The subset of relevant labelled documents may then be split into a train/validate/test data sets in accordance with a split parameter. For example, the subset may be split 80/10/10 between train/validate/test data sets, respectively.

Next, stemming, lemmatization, stop words, HTML tag removal, and common words techniques may be performed on the subset of relevant labelled documents. For example, this step can be performed by using NLP tools like Beautiful Soup, NLTK, and GENSIM LIBRARY. Next, machine learning classifier may be trained by employing machine learning and AI algorithms (e.g., DNNs, Random forest, etc.) The accuracy of the model may be evaluated during training phase and may be determined by using a train/validate/test dataset. For example, the trained model may result in training loss of 0.16 with accuracy of 90.24%, and a validation loss of 0.19 with accuracy of 89.15%, and test loss of 0.14 with accuracy of 93%.

After training, the machine learning model may be used to associate "unlabeled" data, i.e., any OEM repair procedure document to a collision estimate line item, including parts and/or labor operations. The machine learning model may utilize the decision data values that are determined to be related to data in the repair document (e.g., based on vehicle name, document title, YMME) from a decision model database 460 when determining the new associations between an unmapped repair document for any vehicle and any vehicle part and/or labor operation, at 430. For example, the machine learning model may identify keyword and phrases in the repair document and determine if matches exist between the values stored in decision model database 460 when making the determination. Depending on match reliability, the machine learning model may create accurate associations for unlabeled repair documents.

Upon receiving a repair document and repair information related to a collision repair estimate, the mapping tool may apply the identity of the field as an input to the trained machine learning model in, at 430. Responsive to this input, the trained machine learning model may provide the selected match(es) as output with a certain confidence measure.

The process 400 may include the machine learning model providing the associations and/or recommendations, responsive to the provided inputs, at 430. For example, process 400 may generate association suggestions or automatically associate repair procedure documents published by Ford to all Ford vehicles, all labor operations, and/or parts based on a knowledge base built from GM, Toyota, BMW, and Ford information (i.e., all OEM information).

In some embodiments, process 400 may include a quality control phase 420 beginning by user 404 selecting, from document repository 440, association suggestions and/or actual associations between repair documents and repair information determined by the machine learning algorithm and manually verifying the accuracy of the machine learning determination, for examples via the process 200 illustrated in FIG. 2. Those associations determined by user 404 as inaccurate may be rejected. By contrast, those associations user 404 deems as accurate or otherwise acceptable may be accepted. In some embodiments, user 404 may complete the mapping process started by the machine learning algorithm. In some embodiments, user 404 accepted associations from the machine learning algorithm may be further used for relearning and as re-tuning the machine learning model for enhanced accuracy of future predictions.

Figure 5:
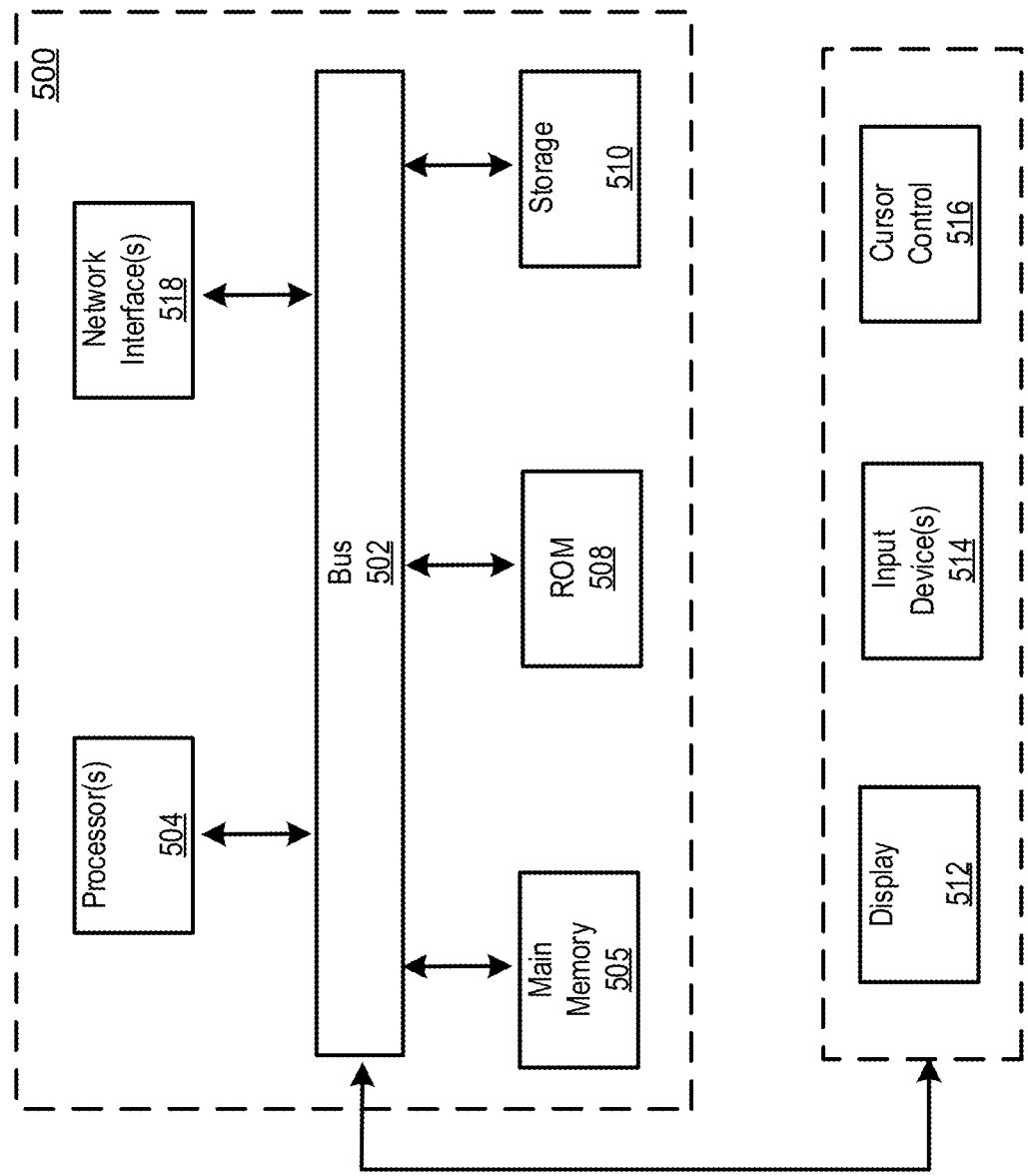
FIG. 5 illustrates an example computing system that may be used in implementing various features of embodiments of the disclosed technology.

In cases where associations determined by process 400 are inaccurate, user 404 may manually reject the associated mapping and that rejected associated mapping may in turn be fed back to the model for further relearning and as re-tuning the machine learning model for enhanced accuracy of future predictions. The relearned model may then be redeployed and utilized again to update and complete the mapping process with enhanced precision.

Where circuits are implemented in whole or in part using software, in one embodiment, these software elements can be implemented to operate with a computing or processing system capable of carrying out the functionality described with respect thereto. One such example computing system is shown in FIG. 5. Various embodiments are described in terms of this example-computing system 500. After reading this description, it will become apparent to a person skilled in the relevant art how to implement the technology using other computing systems or architectures.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information.

Hardware processor(s) 504 may be, for example, one or more general purpose microprocessors and/or specialized graphical processors.

The computer system 500 also includes a main memory 505, such as a random access memory (RAM), cache and/or other dynamic storage devices, coupled to bus 502 for storing information and instructions to be executed by processor 504. Main memory 505 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such a SSD, magnetic disk, optical disk, or USB thumb drive (Flash drive), etc., is provided and coupled to bus 502 for storing information and instructions.

The computer system 500 may be coupled via bus 502 to a display 512, such as a transparent heads-up display (HUD) or an optical head-mounted display (OHMD), for displaying information to a computer user. An input device 514, including a microphone, is coupled to bus 502 for communicating information and command selections to processor 504. An output device 516, including a speaker, is coupled to bus 502 for communicating instructions and messages to processor 504.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, boy Java, Java, C or C++. A software component may be compiled and linked into an executable program, installed in a dynamic link library, or may be written in an interpreted programming language such as, for example, BASIC, Perl, or Python. Components may also be written in a database language such as SQL and/or handled via a database object such as a trigger or a constraint. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 505. Such instructions may be read into main memory 505 from another storage medium, such as storage device 510. Execution of the sequences of instructions contained in main memory 505 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 505. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   a hardware processor; and
   a non-transitory machine-readable storage medium encoded with instructions executable by the hardware processor, wherein the hardware processor is configured to:
   receive, from a data repository, a first set of repair estimate records and a first repair document, each record of the first set of repair estimate records specifying a damaged part of a first vehicle, and the first repair document specifying instructions for repairing the damaged part of the first vehicle;
   extract first vehicle information including a first manufacturer of the first vehicle from the first set of repair estimate records;
   apply a data categorization model to determine an associative relationship between the first vehicle information, the first repair document, and the damaged part of the first vehicle, wherein the associative relationship is stored in a mapping dataset;
   receive a second set of repair estimate records for a second vehicle, each record of the second set of repair estimate records specifying a damaged part of the second vehicle, wherein the second vehicle is manufactured by a second manufacturer;
   generate a new associative relationship record based on the associative relationship between the first vehicle information, the first repair document, and the damaged part of the second vehicle;
   store the new associative relationship record in the mapping dataset; and
   determine and provide a second repair document specifying instructions for repairing the damaged part of the second vehicle identified by the second set of repair estimate records based on the new associative relationship record in the mapping dataset, wherein the damaged part of the first vehicle correlates to the damaged part of the second vehicle, and wherein the first vehicle information is different than second vehicle information associated with the second vehicle.

2. The system of claim 1, wherein the first vehicle information comprises a year, a make, a model, and an engine of the first vehicle, and wherein the second vehicle information comprises a year, a make, a model, and an engine of the second vehicle.

3. The system of claim 2, wherein the first repair document and the second repair document comprises a general title and a sub-title.

4. The system of claim 3, wherein the first repair document is determined by identifying relevant repair documents associated with one or more parts specified by the first set of repair estimate records by comparing the general title and the sub-title of the first repair document associated with the one or more parts specified by the first set of repair estimate records to each repair document associated with the one or more parts specified by the second set of repair estimate records.

5. The system of claim 1, wherein a machine learning model or Artificial Intelligence (AI) technique is employed to learn patterns and associations between the first repair document and the second repair document.

6. The system of claim 1, wherein the first manufacturer is different than the second manufacturer that manufacturers the second vehicle.

7. The system of claim 1, wherein the first repair document includes the instructions for repairing the damaged part of the first vehicle as images, videos, or animations.

8. The system of claim 1, wherein the first repair document includes labor operations as a workflow, and the labor operations comprise repair, removal, or replacement procedures.

9. The system of claim 1, wherein the first repair document includes information demonstrating how to repair the damaged part of the first vehicle and a variety of different types and models of other vehicles.

10. The system of claim 1, wherein the data repository includes sensor calibration documentation data.

11. The system of claim 1, wherein the hardware processor is further configured to:
    aggregate a set of repair documents associated with the first repair document based on category, component type, damage location, labor operation, vehicle type, or document title.

12. The system of claim 1, wherein the first repair document and the second repair document each comprise a general title and a sub-title, and the general title and the sub-title of each the first repair document and the second repair document are used in determining the correlation between the damaged part of the first vehicle and the damaged part of the second vehicle.

13. A non-transitory machine-readable storage medium encoded with instructions executable by a hardware processor of a computing component, the non-transitory machine-readable storage medium comprising instructions to cause the hardware processor to:
    receive, from a data repository, a first set of repair estimate records and a first repair document, each record of the first set of repair estimate records specifying a damaged part of a first vehicle, and the first repair document specifying instructions for repairing the damaged part of the first vehicle;

extract first vehicle information including a first manufacturer of the first vehicle from the first set of repair estimate records;

apply a data categorization model to determine an associative relationship between the first vehicle information, the first repair document, and the damaged part of the first vehicle, wherein the associative relationship is stored in a mapping dataset;

receive a second set of repair estimate records for a second vehicle, each record of the second set of repair estimate records specifying a damaged part of the second vehicle, wherein the second vehicle is manufactured by a second manufacturer;

generate a new associative relationship record based on the associative relationship between the first vehicle information, the first repair document, and the damaged part of the second vehicle;

store the new associative relationship record in the mapping dataset; and determine and provide a second repair document specifying instructions for repairing the damaged part of the second vehicle identified by the second set of repair estimate records based on the new associative relationship record in the mapping dataset, wherein the damaged part of the first vehicle correlates to the damaged part of the second vehicle, and wherein the first vehicle information is different than second vehicle information associated with the second vehicle.

14. The non-transitory machine-readable storage medium of claim 13, wherein the first vehicle information comprises a year, a make, a model, and an engine of the first vehicle, and wherein the second vehicle information comprises a year, a make, a model, and an engine of the second vehicle.

15. The non-transitory machine-readable storage medium of claim 14, wherein the first repair document and the second repair document comprises a general title and a sub-title.

16. The non-transitory machine-readable storage medium of claim 15, wherein the first repair document is determined by identifying relevant repair documents associated with one or more parts specified by the first set of repair estimate records by comparing the general title and the sub-title of the first repair document associated with the one or more parts specified by the first set of repair estimate records to each repair document associated with the one or more parts specified by the second set of repair estimate records.

17. A method implemented by a server computer, the method comprising:

receiving, from a data repository, a first set of repair estimate records and a first repair document, each record of the first set of repair estimate records specifying a damaged part of a first vehicle, and the first repair document specifying instructions for repairing the damaged part of the first vehicle;

extracting first vehicle information including a first manufacturer of the first vehicle from the first set of repair estimate records;

applying a data categorization model to determine an associative relationship between the first vehicle information, the first repair document, and the damaged part of the first vehicle, wherein the associative relationship is stored in a mapping dataset;

receiving a second set of repair estimate records for a second vehicle, each record of the second set of repair estimate records specifying a damaged part of the second vehicle, wherein the second vehicle is manufactured by a second manufacturer;

generating a new associative relationship record based on the associative relationship between the first vehicle information, the first repair document, and the damaged part of the second vehicle;

storing the new associative relationship record in the mapping dataset; and determining and providing a second repair document specifying instructions for repairing the damaged part of the second vehicle identified by the second set of repair estimate records based on the new associative relationship record in the mapping dataset, wherein the damaged part of the first vehicle correlates to the damaged part of the second vehicle, and wherein the first vehicle information is different than second vehicle information associated with the second vehicle.

18. The method of claim 17, wherein the first vehicle information comprises a year, a make, a model, and an engine of the first vehicle, and wherein the second vehicle information comprises a year, a make, a model, and an engine of the second vehicle.

19. The method of claim 18, wherein the first repair document and the second repair document comprises a general title and a sub-title.

20. The method of claim 19, wherein the first repair document is determined by identifying relevant repair documents associated with one or more parts specified by the first set of repair estimate records by comparing the general title and the sub-title of the first repair document associated with the one or more parts specified by the first set of repair estimate records to each repair document associated with the one or more parts specified by the second set of repair estimate records.

* * * * *